United States Patent

[11] 3,576,124

| [72] | Inventor | Thomas E. O'Connor<br>Hawthorne, N.J. |
|---|---|---|
| [21] | Appl. No. | 808,407 |
| [22] | Filed | Mar. 19, 1969 |
| [45] | Patented | Apr. 27, 1971 |
| [73] | Assignee | The Bendix Corporation |

[54] SYSTEM AND METHOD FOR ALIGNING AN INERTIAL NAVIGATION SYSTEM
10 Claims, 1 Drawing Fig.

[52] U.S. Cl. ................................................. 73/1, 73/178
[51] Int. Cl. ...................................................... G01c 25/00
[50] Field of Search ............................................ 73/1 (A), 1 (D), 1 (E)

[56] References Cited
UNITED STATES PATENTS

| 3,028,598 | 4/1962 | Gibbs et al. | 73/1E |
| 3,107,514 | 10/1963 | Walker | 73/1E |
| 3,407,643 | 10/1968 | Wilson | 73/1D |

*Primary Examiner*—S. Clement Swisher
*Attorneys*—Plante, Hart, Smith and Thompson and Ronald G. Gillespie ABSTRACT: A system and a method of aligning an inertial navigation system providing signals corresponding to azimuth movement of a vehicle moving in a known azimuth. The azimuth movement signals are compared with a signal corresponding to the known azimuth to provide a difference signal for correcting the azimuth movement signals accordingly.

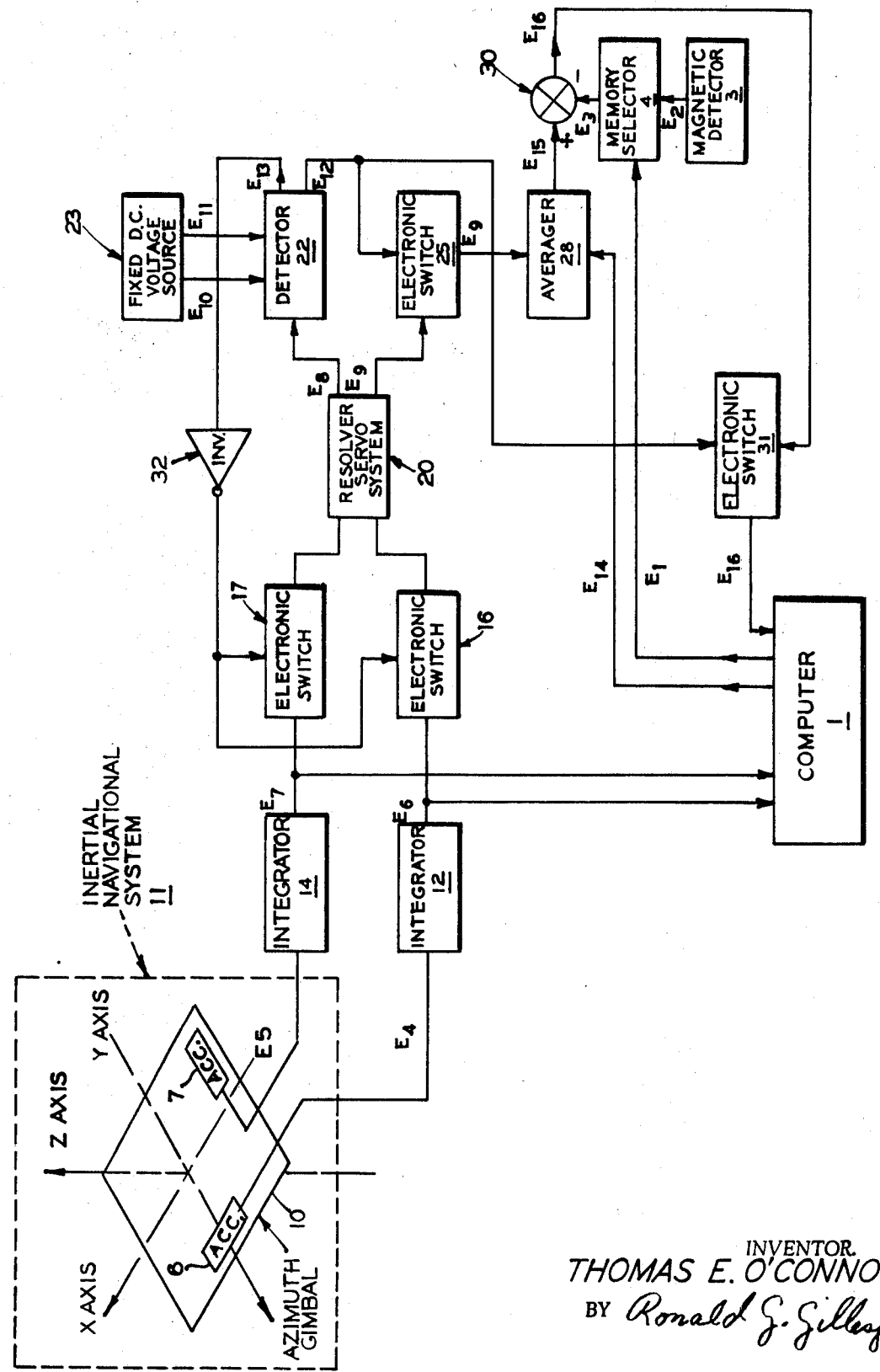

3,576,124

1

SYSTEM AND METHOD FOR ALIGNING AN INERTIAL NAVIGATION SYSTEM

BACKGROUND OF THE INVENTION

1. Field of the Invention

This invention relates to measuring and testing systems and, more particularly, to a system and method for aligning an inertial navigation system.

2. Description of the Prior Art

Alignment systems for inertial navigation systems in aircrafts such as that disclosed in U.S. Pat. No. 3,407,643 issued Oct. 29, 1968 to Peter Wilson, heretofore used a lateral distance indicated by the inertial navigation system in conjunction with a premeasured distance along a takeoff runway for aligning the inertial navigation system of a plane during takeoff. The present invention uses the difference between a known azimuth of the takeoff runway and the azimuth movement indicated by the inertial navigation system as the plane takes off to correct subsequent indicated azimuth movement.

The present invention further distinguishes over the Wilson patent in that the system of the present invention is automatic in its operation. The present invention uses the speed of the aircraft while taking off to control the starting and stopping alignment of the inertial navigation system. The alignment system distinguishes between the takeoff movement and taxiing and flight movement of the aircraft so that alignment is automatic during takeoff from an airport.

The present invention further distinguishes over the disclosed alignment system in the aforenoted U.S. Pat. in providing for storage of the known azimuths for all runways from which an aircraft may take off and in selecting the azimuth of the takeoff runway so that alignment of the inertial navigation system occurs automatically with every takeoff of the aircraft.

SUMMARY OF THE INVENTION

A system for aligning an inertial navigation system providing signals corresponding to the movement of a vehicle comprising means for providing a signal corresponding to a known azimuth in which the vehicle is moving. The movement signals are applied to means for providing an azimuth movement signal corresponding to the movement signals from the inertial navigation system. The known azimuth signal and the azimuth movement signal are applied to subtracting means for providing a signal corresponding to the difference between the known azimuth signal and the azimuth movement signal. The difference signal is applied to means connected to the navigation system for correcting the movement signals from the navigation system in accordance with the difference signal.

One object of the present invention is to provide a self-sustained system for aligning inertial navigation systems.

Another object of the present invention is to align an inertial navigation system in a vehicle whenever the vehicle moves in a preselected known azimuth so as to minimize the effect of cumulative errors in the inertial navigation system.

A further object of the present invention is to provide automatic alignment of an inertial navigation system in a vehicle.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The sole FIGURE is a block diagram showing one embodiment of a novel inertial navigation alignment system constructed in accordance with the present invention.

DESCRIPTION OF THE INVENTION

While an inertial navigation system is in use, cumulative errors increase to a point where the inertial navigation system is inaccurate. However, cumulative errors can be minimized by aligning the inertial navigation system of the aircraft prior to takeoff from each airport. The present invention aligns the inertial navigation system of the aircraft initially and whenever the aircraft takes off thereafter.

Referring to the FIGURE, there is shown a system mounted in an aircraft for aligning an inertial navigation system 11 in the aircraft in which data relating to the azimuth of each runway of all airports which may be used by the aircraft and data corresponding to the coordinates of all those airports are stored in a computer 1, which may be aircraft's computer.

Computer 1 may be a conventional-type analog or digital general purpose airborne computer. By way of example, computer 1 may be a BDX-600 digital airborne computer manufactured by the Bendix Corp. When computer 1 is a digital computer all signals provided to computer 1 must be converted to digital signals which may be accomplished by using conventional-type analog-to-digital converters. Signals provided by a digital computer 1, except timing signals, must be converted to analog signals which may be accomplished by using conventional-type digital-to-analog converters. Although computer 1 is necessary to the overall combination it is not necessary for one skilled in the art to know the details of computer 1 in order to understand the invention. Computer 1 identifies the airport at which the aircraft is located by using the most recent signals from the inertial navigation system 11 and the stored coordinates data and provides a plurality of signals identified as signal $E_1$, corresponding to the azimuths of all runways at that airport and a timing signal $E_{14}$. As the aircraft aligns itself on a takeoff runway, a magnetic detector 3 provides a signal $E_2$ corresponding to an approximate azimuth of the runway. A memory selector 4 is connected to computer 1 and to detector 3. Memory selector 4 stores signal $E_1$, corresponding to azimuths for each runway, received from computer 1, selects the azimuth of the takeoff runway in response to signal $E_2$ from magnetic detector 3 and provides an output $E_3$ corresponding thereto. Memory selector 4 may be a temporary memory with logic selection circuitry and may be physically part of computer 1 when signal $E_1$ is a digital signal. When signal $E_1$ represents analog signals, memory selector 4 may be a plurality of comparators and switches connected in a manner similar to the connection of comparator 22 and switch SW2 shown in U.S. Pat. No. 3,407,643. The comparators compared each runway azimuth signal from computer 1 with signal $E_2$ from magnetic detector 3 and the runway azimuth signal comparable to signal $E_2$ causes its corresponding comparator to control its corresponding switch to pass the selected runway azimuth signal as signal $E_3$.

Accelerometers 6 and 7 are mounted on an azimuth gimbal 10 of the inertial navigation system 11 and provide pulse outputs $E_4$ and $E_5$, respectively, corresponding to accelerations along the X and Y axes, respectively, of gimbal 10. Integrators 12 and 14 are connected to accelerometers 6 and 7, respectively, and integrate the outputs $E_4$ and $E_5$ and provide outputs $E_6$ and $E_7$ corresponding to velocities along the X and Y axes of the azimuth gimbal 10.

Electronic switches 16 and 17 are connected to integrators 12 and 14, respectively, and pass the outputs $E_6$ and $E_7$ to a resolver servosystem 20 which resolves the two velocity vector outputs into two signals $E_8$ corresponding to the magnitude of a resultant velocity vector, and $E_9$ corresponding to an angle between the resultant velocity vector and the X-axis and corresponding to the azimuth movement indicated by inertial navigation system 11.

A detector 22, connected to resolver servosystem 20, to electronic switches 25 and 31, and to a source 23 providing fixed direct current voltages $E_{10}$ and $E_{11}$, compares magnitude signal $E_8$ with voltages $E_{10}$ and $E_{11}$ and provides signals $E_{12}$ and $E_{13}$ corresponding thereto. Signal $E_{12}$ changes from a low level to a high level direct current voltage when velocity magnitude signal $E_8$ exceeds the amplitude of voltage $E_{10}$ indicating that the aircraft has exceeded a minimum velocity thus assuring that alignment occurs during takeoff and not while the aircraft is taxiing around the airport.

When the resultant velocity of the aircraft exceeds a predetermined value to which voltage $E_{11}$ corresponds, indicating takeoff is about to occur, signal $E_{12}$ changes from a high level to a low level direct current voltage while signal $E_{13}$ changes from a low level to a high level direct current voltage.

Azimuth movement signal $E_9$, from resolver servosystem 20, is applied to electronic switch 25 along with signal $E_{12}$ from detector 22. Switch 25 passes azimuth movement signal $E_9$ when signal $E_{12}$ is a high level direct current voltage and signal $E_9$ is applied to an averager 28 connected to computer 1 and receiving signal $E_{14}$.

Averager 28 integrates azimuth movement signal $E_9$ in accordance with timing signal $E_{14}$ received from computer 1 so as to provide a signal $E_{15}$ corresponding to the average of the variations in azimuth movement signal $E_9$. As the aircraft moves down the takeoff runway, it normally will not follow a straight line but will move from side to side of the centerline of the runway due to the pilot's manual control of the aircraft. However, since the pilot tries to follow the centerline of the runway, the variations of azimuth movement signal $E_9$ will be averaged out by the averager 28 causing signal $E_{15}$ to correspond to the average azimuth movement.

Subtracting means 30 is connected to averager 28 and to memory selector 4 and subtracts known azimuth signal $E_3$ from the average azimuth movement signal $E_{15}$. The difference between the known azimuth signal $E_3$ and the average azimuth movement signal $E_{15}$ corresponds to the inaccuracy of inertial navigation system 11. Subtracting means 30 provides a signal $E_{16}$ corresponding to the difference between the azimuth signals to electronic switch 31 which also receives signal $E_{12}$ from detector 22. Switch 31 passes difference signal $E_{16}$ when signal $E_{12}$ is a high level direct current voltage and blocks difference signal $E_{16}$ when signal $E_{12}$ is a low level direct current voltage to prevent erroneous signals from subtracting means 30, occurring while the aircraft is flying or taxiing, from affecting signals from inertial navigation system 11. Electronic switch 31, when enabled, applies difference signal $E_{16}$ to computer 1 which stores and uses the difference signal $E_{16}$ to correct subsequent signals from inertial navigation system 11.

As the velocity of the aircraft increases, signal $E_{12}$ changes to a low level direct current voltage as heretofore explained causing switches 25 and 31 to prevent further alignment computation by blocking azimuth movement signal $E_9$ and difference signal $E_{16}$, respectively. Signal $E_{13}$ also changes from a low level direct current voltage to high level as heretofore explained. Electronic switches 16 and 17 previously passed signals $E_6$ and $E_7$, respectively, while signal $E_{13}$ was at the low level since an inverter 32, connected to electronic switches 16 and 17 and to detector 22, inverted signal $E_{13}$ to a high level direct current voltage thereby enabling switches 16 and 17. With signal $E_{13}$ at a high level, inverter 32 output is a low level direct current voltage which disables switches 16 and 17 and prevents passage of signals $E_6$ and $E_7$ to resolver servosystem 20. Computer 1 continues to receive signals $E_6$ and $E_7$ and computes the location of the aircraft based on signals $E_6$ and $E_7$ and the stored difference signal $E_{16}$.

Although an alignment system for an inertial navigation system in an aircraft has been shown, the system may be used to align any inertial navigation system on a ship or in any other vehicle which moves in a known azimuth, such as the azimuth of a channel in a harbor, during its voyage.

The present invention, heretofore described, is a self-sustained system for automatically aligning an inertial navigation system in a vehicle whenever the vehicle moves in a preselected known azimuth so as to minimize the effect of cumulative errors in the inertial navigation system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A system for aligning an inertial navigation system providing signals corresponding to movement of a vehicle, comprising means for providing a signal corresponding to a known azimuth in which the vehicle is moving which includes means for storing information corresponding to all azimuths available to the vehicle for movement, and means connected to the storing means for automatically selecting the azimuth in which the vehicle is moving and causing the storing means to provide a known azimuth signal corresponding to the selected azimuth, means responsive to the movement signals from the navigation system for resolving the movement signals to a signal corresponding to azimuth movement of the vehicle, means connected to the storing means and to the azimuth movement signal means for providing a signal corresponding to the difference between the known azimuth signal and the azimuth movement signal, and means connected to the navigation system and to the difference signal means for correcting the movement signals in accordance with the difference signal.

2. A system as described in claim 1 in which the azimuth movement signal means includes averaging means connected to the difference means for applying an average azimuth movement signal so as to average out the effect on the azimuth movement signal of spurious excursions of the vehicle as it moves in the known azimuth.

3. A system as described in claim 1 in which the correcting means includes a computer which computes the location of the vehicle in response to the movement signals and the difference signal.

4. A method for aligning an inertial navigation system comprising moving the inertial navigation system in a known azimuth causing it to provide movement signals, resolving the movement signals to a signal corresponding to azimuth movement of a vehicle, storing signals corresponding to known azimuths, selecting a known azimuth signal corresponding to the azimuth that the inertial navigational system is moving in, subtracting the known azimuth signal from the azimuth movement signal from the inertial navigation system algebraically to determine the difference between the azimuth movement signal and the known azimuth signal, providing a signal corresponding to the difference and correcting subsequent movement signals from the inertial navigation system in accordance with the difference signal.

5. A system as described in claim 1 in which the selection means is a magnetic detector providing an output to the storing means corresponding approximately to azimuth movement of the vehicle causing the storing means to provide a signal corresponding to a known azimuth closest to the approximate azimuth detected by the magnetic detector.

6. A system as described in claim 1 further comprising control means connecting the azimuth movement signal means to the difference means for applying the azimuth movement signal to the difference means only when the vehicle is moving in the known azimuth.

7. A system as described in claim 6 in which the movement signals correspond to accelerations along the X and Y axes of the inertial navigation system; the azimuth movement signal means includes integrating means for integrating the movement signals and providing signals corresponding to velocities, and means for resolving the velocity signals to the azimuth movement signal and to a signal corresponding to the speed of the vehicle; and the control means includes means connected to the resolving means for providing a command signal in response to the speed signal when the speed of the vehicle is between predetermined minimum and maximum speeds peculiar to movement of the craft in the known azimuth, and switching means connected to the resolving means and to the command signal means for applying the azimuth movement signal to the difference means in response to the command signal so that alignment of the inertial navigation system only occurs when the vehicle is moving in the known azimuth.

8. A system as defined in claim 8 in which the command signal means includes a detector connected to the resolving means for comparing the speed signal with two reference voltages having amplitudes corresponding to the minimum and maximum speeds and providing the command signal when the amplitude of the speed signal is greater than the amplitude of a first reference voltage but less than the amplitude of a second reference voltage.

9. A method for aligning an inertial navigation system comprising moving the inertial navigation system in a known azimuth causing it to provide movement signals, resolving the movement signals to a signal corresponding to azimuth movement of a vehicle, providing a signal corresponding to the known azimuth, subtracting the known azimuth signal from the azimuth movement signal from the inertial navigation system algebraically to determine the difference between the azimuth movement signal and the known azimuth signal, providing a signal corresponding to the difference and correcting subsequent movement signals from the inertial navigation system in accordance with the difference signal.

10. A method for aligning an inertial navigation system as described in claim 9 further comprising averaging the azimuth movement signal prior to subtracting so as to average out spurious azimuth movement signals.